(12) United States Patent
Elbel et al.

(10) Patent No.: US 7,254,517 B2
(45) Date of Patent: Aug. 7, 2007

(54) EARLY PROGNOSIS OF THE RELIABILITY OF A TECHNICAL SYSTEM

(75) Inventors: Benedikte Elbel, München (DE); Oliver Mäckel, München (DE)

(73) Assignee: Siemens Aktiengesellschaft, Munich (DE)

( * ) Notice: Subject to any disclaimer, the term of this patent is extended or adjusted under 35 U.S.C. 154(b) by 153 days.

(21) Appl. No.: 10/503,228

(22) PCT Filed: Sep. 25, 2002

(86) PCT No.: PCT/DE02/03631

§ 371 (c)(1),
(2), (4) Date: Aug. 2, 2004

(87) PCT Pub. No.: WO03/065138

PCT Pub. Date: Aug. 7, 2003

(65) Prior Publication Data

US 2005/0021293 A1  Jan. 27, 2005

(30) Foreign Application Priority Data

Feb. 1, 2002  (DE) .............................. 102 04 048

(51) Int. Cl.
*G06F 15/00* (2006.01)
(52) U.S. Cl. .................... 702/183; 717/154
(58) Field of Classification Search .............. 702/90, 702/118, 119, 120, 123, 179, 181, 182, 183, 702/184, 185, 186; 714/37, 38, 47–49; 717/154
See application file for complete search history.

(56) References Cited

U.S. PATENT DOCUMENTS

| 5,210,704 | A | 5/1993 | Husseiny ................... 702/34 |
| 5,822,218 | A | 10/1998 | Moosa et al. ................. 716/4 |
| 6,651,244 | B1 * | 11/2003 | Smith et al. ................ 717/154 |
| 6,862,696 | B1 * | 3/2005 | Voas et al. ................... 714/38 |
| 2002/0078403 | A1 * | 6/2002 | Gullo et al. ................. 714/37 |

OTHER PUBLICATIONS

Srinivasan Ramani et al. SREPT: Software Reliability Estimation and Prediction Tool, 1998, Springer-Verlag, Berlin, Heidelberg, pp. 27-36.*
Krishnamoorthy Srinivasan et al., Machine Learning Aproches to Estimating Software Development Effort, 1995, IEEE, pp. 126-137.*
Andersson, "A Survey on Software Quality Metrics" Abo Akademi University, Finland, 1990, pp. 1-22.

(Continued)

*Primary Examiner*—Hal Wachsman
*Assistant Examiner*—Mohamed Charioui
(74) *Attorney, Agent, or Firm*—Staas & Halsey LLP

(57) ABSTRACT

Computer-supported prognosis of the reliability of a technical system, which comprises a processor on which programs are run determines an analysis and/or projection prognosis figure, which gives the expected complexity for generation of the programs in a metric for the analysis and/or the projection. An implementation figure is determined from the analysis and/or projection prognosis figure which gives the expected complexity for production of the programs in a metric for the implementation. Finally a reliability prognosis figure is determined from the implementation prognosis figure which gives the expected reliability of the programs.

36 Claims, 2 Drawing Sheets

OTHER PUBLICATIONS

Brocklehurst et al., "Predictably Dependable Computing Systems", Technical Report, ESPRIT BRA 3092—pdcs No. 58, Feb. 1992, pp. 1-19.

Lawrence, "Software Reliability and Safety in Nuclear Reactor Protection Systems", US Nuclear Regulartory Commission, 1993, pp. 101-105.

Balzert, Lehrbuch der Software-Technik (Software Reliability and Safety in Nuclear Reactor Protection Systems), 2. Auflage, Spektrum Akademischer Verlag, Heidelberg, 2000, pp. 83-93.

Liggesmeyer, "Qualitätssicherung softwareintensiver technischer Systeme", Spektrom Akademischer Verlag, Heidelberg, 2000, p. 192.

* cited by examiner

|   | A | B | C | D | E |
|---|---|---|---|---|---|
| A | APM[FP] | | | | |
| B | | EPM[FP] | | | |
| C | | EPM[FP] | IM[LOC] | | |
| B | | | IPM[LOC] | TZPM[MTTF] | FZPM[MTTF] |
| C | | | IPM[LOC] | TZPM[MTTF] | FZPM[MTTF] |
| D | | | | TZPM[MTTF] | FZPM[MTTF] |
| E | | | | | FZM[MTTF] |

EARLY PROGNOSIS OF THE RELIABILITY OF A TECHNICAL SYSTEM

CROSS REFERENCE TO RELATED APPLICATIONS

This application is based on and hereby claims priority to PCT Application No. PCT/DE02/03631 filed on Sep. 25, 2002 and German Application No. 102 04 048.6 filed on Feb. 1, 2002, the contents of which are hereby incorporated by reference.

BACKGROUND OF THE INVENTION

The application relates to the prognosis of the reliability of a technical system having a processor on which a program runs.

Technical systems are offering an ever greater variety of functions. Often the associated functions can only be realized if the processor on which the program runs is used in a technical system. For instance, in the case of a video recorder or a mobile phone, the processor and the associated program have become indispensable parts of these technical systems.

The more the functions of a technical system are no longer realized using purely mechanical for example, but rather require the use of the aforementioned processor and program, the more decisive a role the reliability of the program plays for the reliability of the technical system as a whole.

Errors in the program usually lead to a partial or complete failure of the technical system. Such failures can be manifested in the form of malfunctions, or else in the non-availability of certain technical functions of the technical system. Failures can also cause damage to the mechanical or electronic elements of the technical system. Finally, such failures can often result in serious collateral damage, such as the leaking of cooling fluid from a refrigerator or a reactor vessel for example.

It is therefore vital for the person skilled in the art to be able to make predictions already during the development of the technical system and the associated program about the reliability or about the effort required to achieve a given level of reliability.

From Lawrence, Dennis: "Software Reliability and Safety in Nuclear Reactor Protection Systems", US Nuclear Regulatory Commission, 1993, pages 101 to 105, models, in particular the Musa model, are known with which it is possible to determine the increase in reliability of the program in a test period.

One disadvantage of these models is that they can only be used at a relatively late stage, namely only once the program and the technical system are already in the test phase. Within a division of the development and deployment of a program into analysis phase, design phase, implementation phase, test phase and field phase, the test phase is at the end of the development period and second to last in the overall chain.

There is however a need to produce reliability prognoses for technical systems already much earlier in the development of the respective program.

Methods for estimating cost and effort are known from the field of systems analysis of technical systems. Thus, for example from Balzert, Helmut: "Lehrbuch der Software-Technik", 2nd edition, Spektrum Akademischer Verlag, Heidelberg, 2000, pages 83 to 93, the function point method is known in which the effort for producing a program is quantified using function points. It is possible to estimate the implementation effort from the function points by assigning an average number of programming lines (lines of code) to each function point.

In the field of quality assurance of technical systems it is known to determine the number of expected errors from the number of lines of code. See for example Liggesmeyer, Peter: "Qualitätssicherung softwareintensiver technischer Systeme", Spektrum Akademischer Verlag, Heidelberg, 2000, page 192.

Described in WO00/29993A2 is a method in which models which include as variables values that describe a technical system are calculated by statistical methods. Using these models it is possible to make prognoses about the time or quality of completion of the technical system. The method classifies the models with respect to their prediction quality and, using a holdout method, calculates a model that then only contains significant values that have a decisive influence on the realization of the technical system. In particular regression or discrimination analytical methods are used here as statistical methods for calculating the models (see for example Richard A. Johnson, Dean W. Wichern, "Applied Multivariate Statistical Analysis", Prentice Hall, 1982).

One possible technical object of the invention is to enable the technical expert to make an early and reliable prognosis of the reliability of a technical system he is to develop, in which the technical functions are executed by a program running on a processor.

SUMMARY OF THE INVENTION

The inventors propose combining various metrics that different technical experts from different fields have discovered, and consequently enabling an early prognosis of the reliability.

Accordingly, a method for the computer-supported prognosis of the reliability of a technical system using prognosis figures has the following steps:

First of all an analysis and/or design prognosis figure is determined which gives the expected effort for producing the program in a metric for the analysis and/or the design of the program. The person skilled in the art can utilize here effort estimation methods used in the analysis and/or design phase, that is to say in the planning phase. For this he must employ his technical knowledge of the technical functions of the technical system for which the reliability is to be predicted. With the analysis and/or design prognosis figure he can then give the expected effort based on verbal requirements for the production of the program. An effort estimation method particularly preferred for this step is the function-point method in which an analysis and/or design prognosis figure is given in a metric for the analysis and/or the design in the form of function points.

An implementation prognosis figure which gives the expected effort for producing the program in a metric for the implementation is then determined from the analysis and/or design prognosis figure determined in the step just described. In the most frequently used metric of implementation, the expected effort for producing the program is given by the number of lines of code. Since the most reliable conversion methods also exist for this with which the number of lines of code for a particular programming language can be determined from the analysis and/or design prognosis figure, the use of the number of lines of code for the implementation prognosis figure is also particularly preferred. Instead of giving the expected effort for producing the program by the number of lines of code, it is however also possible for another metric of implementation to be used, such as a Halstead metric for example.

In a further step, a reliability prognosis figure which gives the expected reliability of the program is then determined from the implementation prognosis figure. Here, too, the technical expert can use his technical expertise by taking into account the type and the level of functionality of the technical system when determining the reliability prognosis figure from the implementation prognosis figure.

The reliability prognosis figure preferably contains the expected reliability of the program in the form of the mean time until a failure occurs. It thus gives the average failure frequency.

If the program is clearly the greatest source of errors in the technical system, then the reliability prognosis figure for the program is at the same time a measure of the expected reliability of the technical system as a whole. Otherwise, any lack of reliability that arises from other sources of errors must also be taken into account.

The reliability prognosis figure is preferably determined from the implementation prognosis figure by determining the errors that are to be expected for the expected effort for producing the program.

The method described confers the advantage that a prognosis about the reliability of the technical system can be made at a very early stage, namely already during analysis of the system requirements. It also confers the advantage that the prognosis can be updated as the development of the program progresses and corrected accordingly. In particular this can be done after determining the effort actually required for producing the program, in that the reliability prognosis figure is recalculated from an implementation figure which gives the effort actually required for producing the program in a metric for the implementation.

If there is no test phase for improving the reliability of the program, or if the final reliability of the technical system delivered to the end customer is to be determined, then the reliability prognosis figure is a field reliability prognosis figure, or it contains a field reliability prognosis figure that gives the reliability of the program in the field phase of the program.

Alternatively, or in addition, the reliability prognosis figure is and/or contains a test reliability prognosis figure which gives the reliability of the program in a test phase of the program.

As a rule, it is specifically the purpose of the test phase to increase the reliability of the program. This means that the reliability of the program varies during the test phase. It is therefore sensible from the point of view of the prognosis to design the test reliability prognosis figure to be time-dependent and to determine the trend of the test reliability prognosis figure during the test phase.

Thus, the duration and/or the effort of the test phase can be determined from the determination of the test reliability prognosis figure during the test phase in the case, for example, of a desired field reliability of the program and a corresponding final reliability of the technical system.

Various parameters can be used for determining the test reliability prognosis figure during the test phase. It is especially preferred if the maximum number of failures to be expected is determined from the implementation prognosis figure.

In addition, the trend of the test reliability prognosis figure can be determined during the test phase using a failure frequency reduction rate. The failure frequency reduction rate indicates to what extent the failure frequency is reduced per unit of time during the test phase. It is thus dependent, among other things, on the structure of the technical system and the significance of the program for the technical system, and must therefore be determined by the technical expert.

In one advantageous development, the method described above can furthermore be combined with methods for determining a selection of significant values of a technical system which are already known from the related art. In particular, the above method can be combined with the method described in WO 00/29993 A2 mentioned in the introduction. For this purpose that contain measured reliabilities are used in the method. The data records are preferably information about already completed projects relating to the development of a technical system. The data of the projects is now used to determine significant prognosis figures of a new project. By the combined method it is therefore possible to determine a selection of prognosis figures that are significant for the reliability of a technical system, in which in the method the prognosis figures for each data record are first determined in accordance with the method for the computer-supported prognosis of reliability, and in a next step the significant prognosis figures are determined by a method known from the related art. For this purpose models are determined that include the prognosis figures as variables, where one of the models includes the significant prognosis figures. The significant prognosis figures are especially relevant here with respect to the realization of the technical system and a model that includes the significant prognosis figures ensures a high reliability of the prognosis. It is thus possible to optimize the reliability of the prognosis with the method.

A prognosis is preferably made on the basis of the models regarding whether a specified target for the reliability of the technical system will be met. Such a specified target may be, for example, a time period within which no failures may occur when the technical system is in operation. The specified target is met when the time between two failures is always greater than the time period of the specified target.

In addition to the prognosis figures, the models may include further figures as variables. This is advantageous especially if the analysis and/or design prognosis figure is given in function points, because still more figures which have an influence on the realization of the technical system are determined during the determination of the function points using the function-point method. The figures can then be incorporated as further figures in the models. The further figures preferably depend here on factors relating to the development of the technical system, in particular motivation and/or level of knowledge of the people involved in the development and/or planned duration for the development of the technical system and/or planned testing outlay during development.

The models are preferably classified on the basis of the data records, wherein one classification figure is determined for the quality of the classification in each case. As a result, it is possible to additionally determine a quality value for each model which reflects in particular the reliability of the prognosis of the model. The way in which such a classification can be made is described in WO 00/29993 A2.

The models are preferably determined using statistical methods, in particular by discrimination or regression analysis. Such methods are known from the related art.

A holdout method is used on the data records to determine the model with the significant prognosis figures. The method is described in WO 00/29993 A2 and therefore will not be discussed any further here.

In a further refinement, models that include prognosis figures as variables are used to predict whether a specified reliability target for a technical system will be met. This is achieved by a method in which the prognosis figures are first determined by the method for the computer-supported prognosis of reliability, and then in a next step models that include prognosis figures as variables are used to predict whether a specified target will be met. Models are preferably used here which were determined using the above-described method for determining a selection of prognosis figures that are significant for the reliability of a technical system. Since for these models preferably a classification figure relating to the quality of the classification was determined, it is additionally possible to establish the quality of the prognosis. It is furthermore possible to use a model that includes significant prognosis figures in the method, with the result that a particularly reliable prognosis is obtained.

In particular, the technical system whose reliability is to be determined is a mobile terminal, a medical device, a device for controlling industrial manufacturing processes, a computer, an system for power generation and/or energy distribution, and/or a telecommunications system.

A program product for a data processing system that contains sections of software code with which one of the methods illustrated can be executed on the data processing system can be executed by suitable implementation of the method in a programming language and translation into code that can be executed by the data processing system. The sections of software code can be stored for this purpose. A program product is understood to mean here the program as a tradable product. It can be available in any form, for instance on paper, a computer-readable data medium or distributed via a network.

A device which is set up to execute one of the methods illustrated can be realized, for example, by programming and setting up a data processing system with suitable means for the aforesaid method.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
FIG. 1 shows a table illustrating the flow of the method.

Reference will now be made in detail to the preferred embodiments of the present invention, examples of which are illustrated in the accompanying drawings, wherein like reference numerals refer to like elements throughout.

Shown running from the bottom to the top of the table in FIG. 1 are the development and deployment phases of program means that can be run on a processor in a technical system.

These are: an analysis phase A, a design phase B, an implementation phase C, a test phase D and a field phase E. While the analysis phase A, the design phase B, the implementation phase C and the test phase D are development phases, the field phase E is characterized by the use of the program and the technical system at the end customer, that is to say in the field, which is why it is interesting in particular from a warranty point of view.

The individual phases for which predictions are made in the respective row, or whose outcome is actually available, are plotted from left to right in the table of FIG. 1.

Accordingly, an early prognosis of reliability made during the analysis phase A can be read off entirely from the row for analysis phase A. The values given in the other rows represent correction steps of this early prognosis during the course of program means development and delivery.

During analysis phase A, in which the system requirements are analyzed, an analysis prognosis figure APM is first determined. For this, based on a requirements specification, efforts are estimated with the aid of the function-point method, and the analysis prognosis figure APM is given in function points FP.

From the analysis prognosis figure APM a design prognosis figure EPM is determined in function points in the analysis phase A for the design phase B. In the column of the design phase B this is shown in the row of the analysis phase A of the table in FIG. 1.

As an alternative to determining the design prognosis figure EPM from the analysis prognosis figure APM, it is also possible not to produce a design prognosis figure EPM until the design phase B, or a common analysis and design prognosis figure is produced directly for the analysis and design phase.

Instead of, as customary, deriving from the analysis and/or design prognosis figure APM, EPM only the development effort for the program, in the analysis phase A an implementation prognosis figure IPM is determined from the analysis and design prognosis figure APM, EPM, in which the function points FP are converted into the expected number LOC of lines of code.

Based on this predicted number LOC of lines of code given by the implementation prognosis figure IPM, in a next step it is possible to estimate the errors that will occur during the first implementation of the program. A reliability prognosis figure can be determined, taking into account the planned testing and correction effort, which is also determined if necessary using the function-point method.

The reliability prognosis figure includes a test reliability prognosis figure TZPM, which contains the usually varying reliability of the program during a test phase in the form of the mean time MTTF until a failure of the technical system occurs as a result of an error in the program, and of the field reliability prognosis figure FZPM, which gives the reliability of the program in the field phase E in the form of the mean time MTTF until the failure of the technical system as a result of an error in the program.

The determination of the reliability prognosis figure TZPM, FZPM from the implementation prognosis figure IPM using reliability models is described in greater detail further below.

As a result of the method described thus far, which can be performed entirely during the analysis phase A, it is already possible in the analysis phase to produce a reliability prognosis relatively easily and inexpensively. In particular, it is already possible at this early stage to give a test reliability prognosis figure TZPM and/or a field reliability prognosis figure FZPM.

When the method was trialed, the values found here demonstrated a surprisingly high degree of correspondence with the values that were actually subsequently obtained. Nevertheless, a further particular advantage of the method is that the prognosis initially made can be constantly further improved during the development and deployment of the program. This is illustrated in the rows of design phase B, of implementation phase C, of test phase D and of field phase E in the table in FIG. 1.

While in the analysis phase A the reliability prognosis figure in the form of the test reliability prognosis figure TZPM and the field reliability prognosis figure FZPM is solely determined by corresponding transformations from the analysis prognosis figure APM, in the design phase B the reliability prognosis figure can already be determined from the design prognosis figure. Since the design prognosis figure usually gives the expected effort for producing the program somewhat more precisely than the analysis prognosis figure, an improvement of the reliability prognosis figure TZPM, FZPM is to be expected as a result of this correction in the design phase B.

However, the result of the reliability prognosis can be substantially corrected in the implementation phase C if the actual effort for producing the program becomes known in the form of the actual number LOC of lines of code. The implementation prognosis figure IMP can then be replaced by the implementation figure IM, and the reliability prognosis figure TZPM, FZPM can be determined from that.

In the test phase D, finally, the test reliability prognosis figure TZPM can be replaced by the test reliability figure TZM, with the result that the predicted field reliability prognosis figure FZPM is further corrected.

In the field phase E, finally, the actual reliability of the program or the technical system respectively, and hence the actual field reliability figure FZM, can be determined. For improving future prognoses for other technical systems or program means, the field reliability figure can then be compared with the field reliability prognosis figures determined in the meantime.

Figure 2:
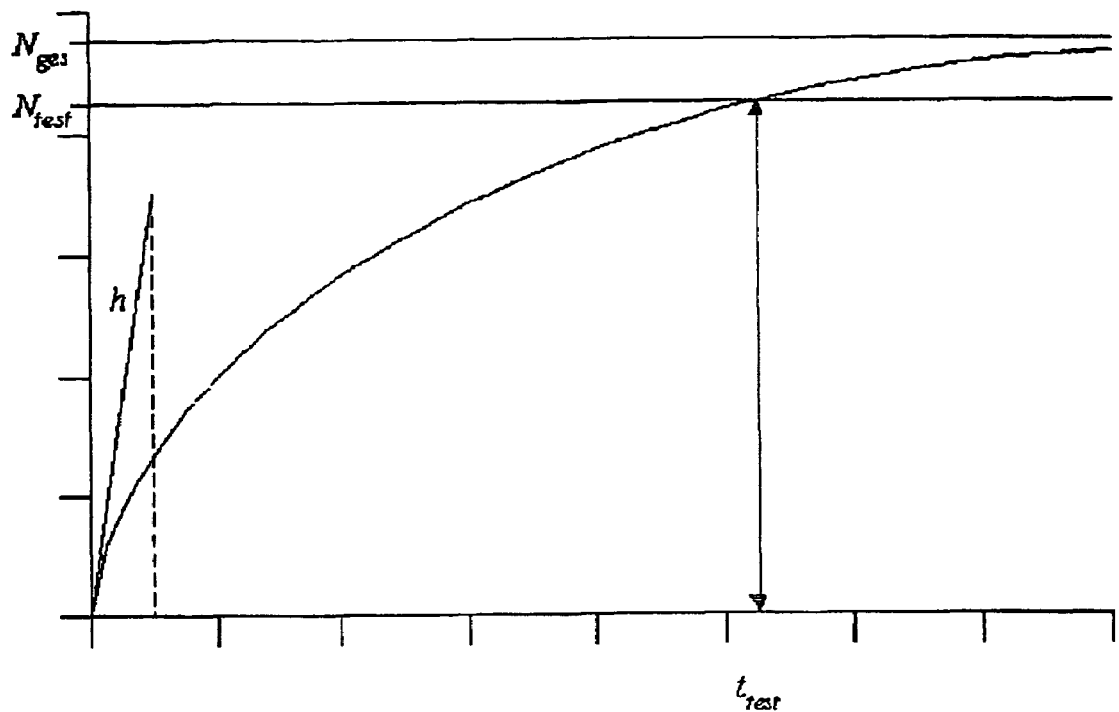
FIG. 2 shows the trend of a plurality of errors during a test phase.

A reliability model for the program will now be discussed with reference to FIG. 2, with which it is possible to determine the trend of the test reliability prognosis figure TZPM during the test phase D. The prognosis of the reliability of the program on the basis of estimated error numbers can, instead of time-independent error correction rates and error detection rates, be performed best with the aid of such reliability models for the reliability of program means, since the latter take account of information about the test and correction activities in the test phase of the technical system. The reliability model presented here is based on a finite number of errors in the program and is therefore particularly suitable for a prognosis based on an estimated number of errors which can be determined from the implementation prognosis figure IPM. The model is based on an assumption that the failure rate of the program during use is at all times proportional to the number of undiscovered errors.

The mean failure number m(t) as a function of the execution time t can be given by $$m(t) = N\left(1 - \exp\left(-\frac{h}{N}t\right)\right) \quad (1)$$

m denotes the total number of errors present in the system at the outset which were determined from the implementation prognosis figure. The constant h represents the failure rate at the beginning of the cumulative error curve, that is to say of the test phase D. It depends on the rate of occurrence for a single error and the error correction rate. Since this is predicated here on a proportional relationship between the size of the program given by the implementation prognosis figure and the total number of errors obtained, it is sensible to interpret h as a constant specifically for the technical system, with the test strategy remaining the same.

The relation shown in Equation 1 enables the derivation of reliability characteristics that can be obtained with a predetermined test effort, on the basis of the estimated number of errors. Thus, the following failure rate is obtained from the derivation of the expression stated in Equation 1

$$\lambda(t) := m'(t) = h\exp\left(-\frac{h}{N}t\right) \quad (2)$$

the inverse value of which is designated as mean time MTTF until a failure occurs (Mean-Time-to-Failure)

$$MTTF(t) := \frac{1}{\lambda(t)} = \left(h\exp\left(-\frac{h}{N}t\right)\right)^{-1} \quad (3)$$

In order to be able to use the model described in Equation 1 for determining reliability prognosis figures, first of all the parameters of the model must be defined.

The parameter N corresponds to the estimated total number of errors that can be calculated from the implementation prognosis figure. The parameter denoted by h, which depends on the type of technical system, must be determined on the basis of prognoses for comparable technical systems. For these prognoses for comparable technical systems, the number of estimated total errors in the system $N_{ges}$, the number of errors $N_{test}$ found during the system test, and the test effort $t_{test}$ employed must be stated.

The parameter h can now be determined from the relationship $$h = -\frac{N_{ges}}{t_{test}}\ln\left(1 - \frac{N_{test}}{N_{ges}}\right) \quad (4)$$

that results from Equation 1. FIG. 2 illustrates the correlation between the model and the parameters in an outline diagram. Like the other factors or tables used in the individual steps of the method for predicting the reliability of a technical system, the definition of the parameter h used for estimating should be based on a continually updated and as wide a data base as possible in accordance with the method described above.

With the aid of the parameter h determined in this way, it is possible to determine on the basis of the estimated total number of errors for the given test effort the expected reliability in the form of a reliability figure, for example using Equation 3 or Equation 2. Moreover, the model relationship enables the test effort which is required to achieve a mean time MTTF until the occurrence of a failure or the reliability given for the failure rate to be determined. Taking the resources planned for testing into account, it is thus possible to realistically plan the release date of the program or the technical system already during the analysis phase A.

The method described above can be used in a method for determining the prognosis figures that are significant for the reliability of a technical system. In turn the significant prognosis figures can be used in a method for the prognosis of whether a specified reliability target for a technical system will be met in which, as a result of the use of significant prognosis figures, a very high reliability of the prognosis is assured.

Figure 3:
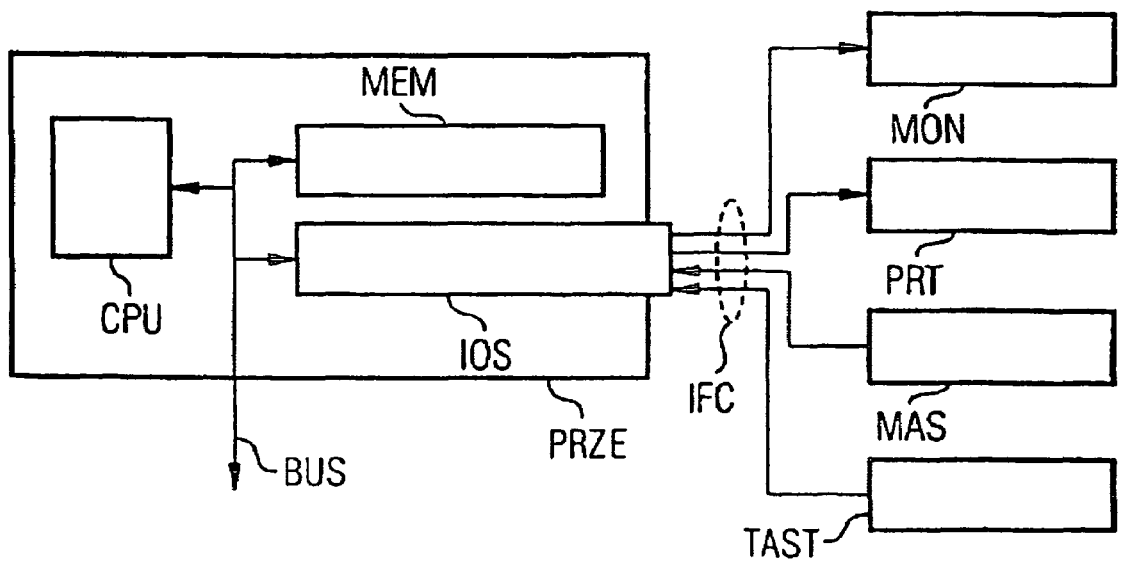
FIG. 3 shows a technical system.

FIG. 3 shows a technical system with a processor PRZE, on which program means can be run. The program PRZE includes a processor CPU, a memory SPE and an input/output interface IOS which can be used in different ways via an interface IFC: an output is visualized on a monitor MON and/or output on a printer PRT via a graphics interface. An input is made using a mouse MAS or a keyboard TAST. The processor PRZE also has a data bus BUS which provides the connection from a memory MEM, the processor CPU and the input/output interface IOS. In addition, additional components can be connected to the data bus BUS, for example additional memory, a data memory in the form of a hard disk, or a scanner. The technical system can also be used as a device for predicting the reliability of another technical system.

The method and device have the following advantages:

The starting points are the system requirements established during the analysis phase, which enable an early prognosis. During development, the prognosis can be constantly improved in the manner described with reference to Table 1 in FIG. 1.

The method enables a precise estimate of the test outlay through the use of reliability models for the program.

The method enables a precise estimate of the correction outlay through the intermediate step of estimating errors in the program.

Easy adaptation to various application areas and new techniques and technologies is possible through the utilization of the function-point method and individual transformation rules.

The method can be used to determine prognosis figures that are significant for the reliability of a technical system.

The method can be used for the reliable prognosis of whether a specified reliability target for a technical system will be met.

The invention has been described in detail with particular reference to preferred embodiments thereof and examples, but it will be understood that variations and modifications can be effected within the spirit and scope of the invention.

The invention claimed is:

1. A method for a computer supported prognosis of reliability of a technical system which has a processor on which a program runs, comprising:
    determining an analysis and/or design prognosis figure which describes an expected effort required to produce the program, the analysis and/or design prognosis figure being determined in a metric for the analysis and/or the design phase of production;
    determining an implementation prognosis figure which describes the expected effort required to produce the program, the implementation prognosis figure being determined from the analysis and/or design prognosis figure and being determined in a metric for the implementation phase of production;
    determining a reliability prognosis figure which describes an expected reliability of the program, the reliability prognosis figure being determined from the implementation prognosis figure wherein
    the reliability prognosis figure is determined in a metric, which is different from the metric for the implementation phase of production and different from the metric for the analysis and/or design phase of production, and the reliability prognosis figure is displayed and/or stored.

2. The method as claimed in claim 1, wherein the reliability prognosis figure includes a test reliability prognosis figure which describes the reliability of the program in a test phase of development.

3. The method as claimed in claim 2, wherein
    before the test phase of development, the reliability prognosis figure is based on a time independent estimated number of errors, and
    during the test phase of development, the reliability prognosis figure is determined based on an actual number of errors and trends in the actual number of errors during the test phase.

4. The method as claimed in claim 2, wherein duration and/or effort of the test phase is determined in association with the test reliability prognosis figure.

5. The method as claimed in claim 2, wherein a maximum number of failures to be expected is determined from the implementation prognosis figure.

6. The method as claimed in claim 2, further comprising determining a failure frequency reduction rate during the test phase of development.

7. The method as claimed in claim 1, wherein the expected effort required to produce the program is described by determining a number of errors that are to be expected.

8. The method as claimed in claim 1, wherein the reliability prognosis figure is recalculated from an implementation prognosis figure which describes the effort actually required to produce the program.

9. The method as claimed in claim 1, wherein the analysis and/or design prognosis figure describes the expected effort in function points and is determined using a function point method.

10. The method as claimed in claim 1, wherein the implementation prognosis figure describes the expected effort in number of expected lines of code.

11. The method as claimed in claim 1, wherein the reliability prognosis figure describes the expected reliability of the program in terms of mean time until a failure occurs.

12. The method as claimed in claim 1, wherein the reliability prognosis figure includes a field reliability prognosis figure which describes the reliability of the program in a field phase of development.

13. A method for determining prognosis figures related to reliability of a technical system having a processor on which a program runs, the prognosis figures being determined for every data record of a plurality of data records, the method comprising:
    determining an analysis and/or design prognosis figure which describes an expected effort required to produce the program, the analysis and/or design prognosis figure being determined in a metric for the analysis and/or the design phase of production;
    determining an implementation prognosis figure which describes the expected effort required to produce the program, the implementation prognosis figure being determined from the analysis and/or design prognosis figure and being determined in a metric for the implementation phase of production; and
    determining a reliability prognosis figure which describes an expected reliability of the program, the reliability prognosis figure being determined from the implementation prognosis figure; and
    determining significant prognosis figures by determining models that include prognosis figures as variables, where one of the models includes the significant prognosis figures wherein the reliability prognosis figure is determined in a metric, which is different from the metric for the implementation phase of production and different from the metric for the analysis and/or design phase of production, and the reliability prognosis figure is displayed and/or stored.

14. The method as claimed in claim 13, wherein, in addition to the prognosis figures, the models include further figures that are variables which are not prognosis figures.

15. The method as claimed in claim 14, wherein the variables which are not prognosis figures depend on factors relating to development of the technical system.

16. The method as claimed in claim 14, wherein the further figures relate to at least one of the following:
   motivation of developers of the technical system,
   level of knowledge of developers of the technical system,
   planned duration for development of the technical system, and
   planned testing outlay during development.

17. The method as claimed in claim 13, wherein a prognosis is made based on the models, regarding whether a specified target for reliability of the technical system will be met.

18. The method as claimed in claim 13, wherein
   the models are classified into classes based on data records, and
   at least one classification figure is determined for each class to represent significance of the prognosis figures.

19. The method as claimed in claim 13, wherein statistical methods are used for determining the models.

20. The method as claimed in claim 13, wherein a discrimination or regression analysis is used for determining the models.

21. The method as claimed in claim 13, wherein a holdout method is used on the data records for determining which model includes the significant prognosis figures.

22. A method for predicting, whether a specified reliability target for a technical system, which has a processor on which a program runs, will be met, comprising:
   determining prognosis figures by a method comprising:
   determining an analysis and/or design prognosis figure which describes an expected effort required to produce the program, the analysis and/or design prognosis figure being determined in a metric for the analysis and/or the design phase of production;
   determining an implementation prognosis figure which describes the expected effort required to produce the program, the implementation prognosis figure being determined from the analysis and/or design prognosis figure and being determined in a metric for the implementation phase of production; and
   determining a reliability prognosis figure which describes an expected reliability of the program, the reliability prognosis figure being determined from the implementation prognosis figure; and
   using a model that includes prognosis figures as variables to predict whether the specified target will be met
   wherein
   the reliability prognosis figure is determined in a metric, which is different from the metric for the implementation phase of production and different from the metric for the analysis and/or design phase of production, and the reliability prognosis figure is displayed and/or stored.

23. The method as claimed in claim 22, wherein each reliability prognosis figure includes a test reliability prognosis figure which describes the reliability of the program in a test phase of the development.

24. The method as claimed in claim 23, wherein
   before the test phase of development, the reliability prognosis figure is based on a time independent estimated number of errors, and
   during the test phase of development, the reliability prognosis figure is determined based on an actual number of errors and trends in the actual number of errors during the test phase.

25. The method as claimed in claim 22, wherein each reliability prognosis figure is determined from the implementation prognosis figure by determining a number of errors that are to be expected for the expected effort for producing the program means.

26. The method as claimed in claim 22, wherein each reliability prognosis figure is recalculated from an implementation prognosis figure which describes the effort actually required to produce the program.

27. The method as claimed in claim 22, wherein each analysis and/or design prognosis figure describes the expected effort in function points and is determined using a function point method.

28. The method as claimed in claim 22, wherein each implementation prognosis figure describes the expected effort in number of expected lines of code.

29. The method as claimed in claim 22, wherein each reliability prognosis figure describes the expected reliability of the program in terms of mean time until a failure occurs.

30. The method as claimed in claim 22, wherein each reliability prognosis figure includes a field reliability prognosis figure which describes the reliability of the program in a field phase of development.

31. The method as claimed in claim 22, further comprising:
   determining models that include prognosis figures as variables;
   identifying a significant model that includes significant prognosis figures; and
   using the significant model to predict whether the specified target will be met.

32. The method as claimed in claim 22, wherein the technical system is a mobile terminal, a medical device, a device for controlling industrial processes, a computer, a system for power generation and/or energy distribution, and/or a telecommunications system.

33. A device for predicting the reliability of a technical system having a processor on which a program runs, comprising:
   an A/D unit to determine an analysis and/or design prognosis figure which describes an expected effort required to produce the program, the analysis and/or design prognosis figure being determined in a metric for the analysis and/or the design phase of production;
   an IPM unit to determine an implementation prognosis figure which describes the expected effort required to produce the program, the implementation prognosis figure being determined from the analysis and/or design prognosis figure and being determined in a metric for the implementation phase of production; and
   an RPF unit to determine a reliability prognosis figure which describes an expected reliability of the program, the reliability prognosis figure being determined from the implementation prognosis figure.

34. The device according to claim 33, wherein
   prognosis figures are determined for every data record,
   models are determined that include prognosis figures as variables, one of the models is a significant model that includes significant prognosis figures, and the significant model is used to determine the significant prognosis figures.

35. A device according to claim 33, further comprising a prediction unit to predict, using a model that includes prognosis figures as variables, whether a specified reliability target will be met.

36. A computer readable medium storing a program for controlling a computer to perform a method for predicting reliability of a technical system having a processor on which a program runs, the method comprising:

determining an analysis and/or design prognosis figure which describes an expected effort required to produce the program, the analysis and/or design prognosis figure being determined in a metric for the analysis and/or the design phase of production;

determining an implementation prognosis figure which describes the expected effort required to produce the program, the implementation prognosis figure being determined from the analysis and/or design prognosis figure and being determined in a metric for the implementation phase of production; and determining a reliability prognosis figure which describes an expected reliability of the program, the reliability prognosis figure being determined from the implementation prognosis figure wherein the reliability prognosis figure is determined in a metric, which is different from the metric for the implementation phase of production and different from the metric for the analysis and/or design phase of production, and the reliability prognosis figure is displayed and/or stored.

\* \* \* \* \*